(12) United States Patent
Kim et al.

(10) Patent No.: US 8,352,808 B2
(45) Date of Patent: Jan. 8, 2013

(54) DATA STORAGE SYSTEM AND DEVICE WITH RANDOMIZER/DE-RANDOMIZER

(75) Inventors: Yong June Kim, Seoul (KR); Jun Jin Kong, Yongin-si (KR); Jae Hong Kim, Seoul (KR); Kyoung Lae Cho, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 589 days.

(21) Appl. No.: 12/573,246

(22) Filed: Oct. 5, 2009

(65) Prior Publication Data

US 2010/0088574 A1 Apr. 8, 2010

(30) Foreign Application Priority Data

Oct. 8, 2008 (KR) .................. 10-2008-0098694

(51) Int. Cl.
*G06F 11/00* (2006.01)
*G06F 12/00* (2006.01)
(52) U.S. Cl. .................. 714/701; 711/127; 711/157
(58) Field of Classification Search .............. 714/701, 714/702; 711/127, 157
See application file for complete search history.

(56) References Cited

U.S. PATENT DOCUMENTS

| 4,993,029 | A | * | 2/1991 | Galbraith et al. | 714/769 |
| 5,592,492 | A | * | 1/1997 | Ben-Efraim et al. | 714/702 |
| 5,745,497 | A | * | 4/1998 | Ben-Efraim et al. | 714/702 |
| 6,543,024 | B2 | | 4/2003 | Gray | |
| 6,785,862 | B1 | * | 8/2004 | Zhang | 714/788 |
| 7,478,220 | B2 | * | 1/2009 | Forrer et al. | 711/173 |
| 2005/0053168 | A1 | * | 3/2005 | Song et al. | 375/261 |
| 2006/0294331 | A1 | | 12/2006 | Forrer, Jr. et al. | |
| 2008/0151618 | A1 | * | 6/2008 | Sharon et al. | 365/185.02 |
| 2008/0215798 | A1 | * | 9/2008 | Sharon et al. | 711/103 |

FOREIGN PATENT DOCUMENTS

KR 1020010031316 A 4/2001

OTHER PUBLICATIONS

Heiko Mantel. 2005. The framework of selective interleaving functions and the modular assembly kit. In Proceedings of the 2005 ACM workshop on Formal methods in security engineering (FMSE '05). ACM, New York, NY, USA, 53-62.*

* cited by examiner

*Primary Examiner* — Cynthia Britt
(74) *Attorney, Agent, or Firm* — Volentine & Whitt, PLLC

(57) ABSTRACT

A data storage device receives write data and includes a controller configured to determine a characteristic of the write data and provide a first control signal in response to the determined characteristic, a randomizer configured to selectively randomize or not randomize the write data in response to the first control signal to thereby generate randomized write data, and a data storage unit configured to store the randomized write data.

15 Claims, 4 Drawing Sheets

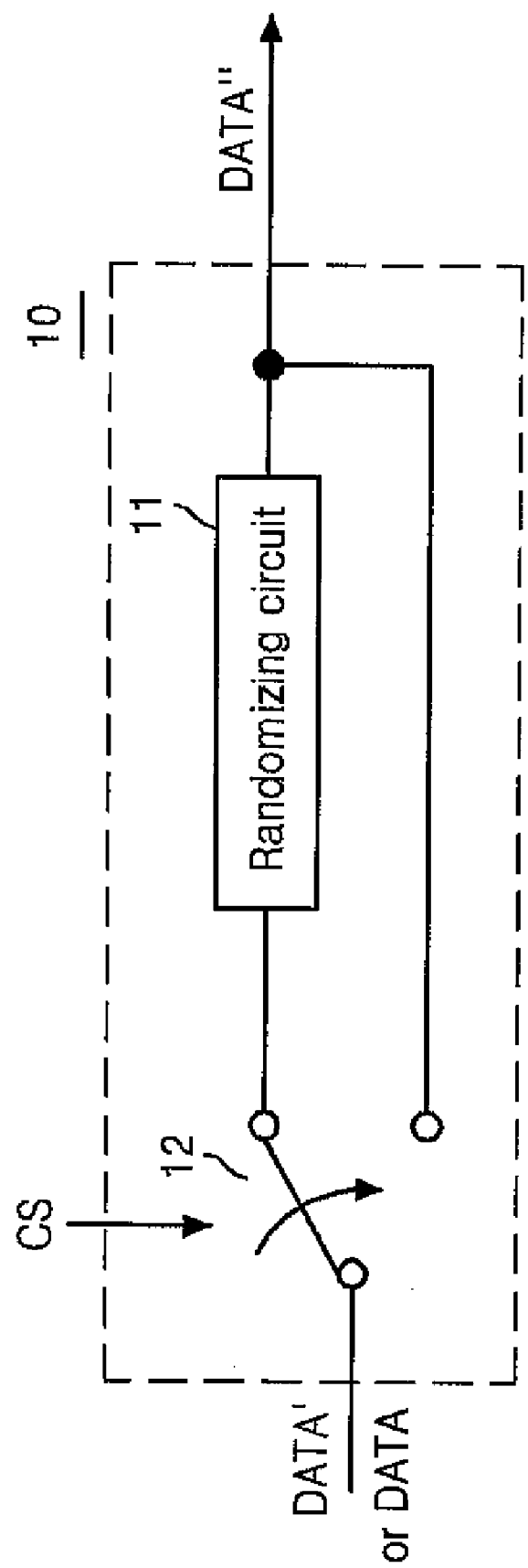

DATA STORAGE SYSTEM AND DEVICE WITH RANDOMIZER/DE-RANDOMIZER

CROSS-REFERENCE TO RELATED APPLICATION

This application claims the benefit of Korean Patent Application No. 10-2008-0098694 filed on Oct. 8, 2008, the subject matter of which is hereby incorporated by reference.

BACKGROUND

The inventive concept relates to a data storage device and a data storage system incorporating the same.

Randomizers may be used to improve the operation of a timing recovery circuit, an automatic gain control circuit, or an adaptive circuit. For example, a randomizer may be used to randomize a sequence of binary data values (i.e., 0's and 1's) to facilitate the process of timing recovery for the data. One commonly used form of randomizer is the so-called "scrambler".

As conventionally implemented, randomizers randomize all input data regardless of characteristic. Thus, the incorporation of a randomizer is not always practical within certain circuits that might benefit from a randomizing functionality. That is, the high overhead (cost and operating speed) associated with conventional randomizers is just too high for many applications. Additionally, since conventional randomizers typically randomize input data by using a single seed, there is a limit to their ability to randomize data.

SUMMARY

Embodiments of the inventive concept provide a data storage device and related data storage system capable of selectively randomizing input data according to one or more characteristics of the data. Embodiments of the inventive concept also provide a data storage device and related data storage system capable of increasing the randomness of data.

According to an aspect of the inventive concept, there is provided a data storage device receiving write data and comprising; a controller configured to determine a characteristic of the write data and provide a first control signal in response to the determined characteristic, a randomizer configured to selectively randomize or not randomize the write data in response to the first control signal to thereby generate randomized write data; and a data storage unit configured to store the randomized write data.

According to another aspect of the inventive concept, there is provided a data storage device retrieving read data and comprising; a data storage unit configured to store the read data, a controller configured to determine a characteristic of the read data and provide a second control signal in response to the determined characteristic, and a de-randomizer configured to selectively de-randomize or not de-randomize the read data in response to the second control signal to thereby generate de-randomized read data.

According to another aspect of the inventive concept, there is provided a system comprising; a controller connected to a memory unit via a system bus, wherein the controller is configured to determine a characteristic of received write data and stored read data, and provide first and second control signals in response to the determined characteristic, a randomizer configured to selectively randomize or not randomize the write data in response to the first control signal to thereby generate randomized write data, a data storage unit configured to store the randomized write data as read data, and a de-randomizer configured to selectively de-randomize or not de-randomize the read data retrieved from the data storage unit in response to the second control signal to thereby generate de-randomized read data.

BRIEF DESCRIPTION OF THE DRAWINGS

Embodiments of the inventive concept may be more clearly understood from the following detailed description taken in conjunction with the accompanying drawings in which:

FIG. 2A is a block diagram illustrating a randomizer according to an embodiment of the inventive concept;

DETAILED DESCRIPTION OF THE EMBODIMENTS

Certain embodiments of the inventive concept will now be described with reference to the accompanying drawings. However, the inventive concept may be variously embodied and should not be construed as being limited to only the illustrated embodiments. Rather, the illustrated embodiments are presented as teaching examples. Throughout the drawings and written description, like reference numbers and labels are used to denote like or similar elements.

Figure 1:
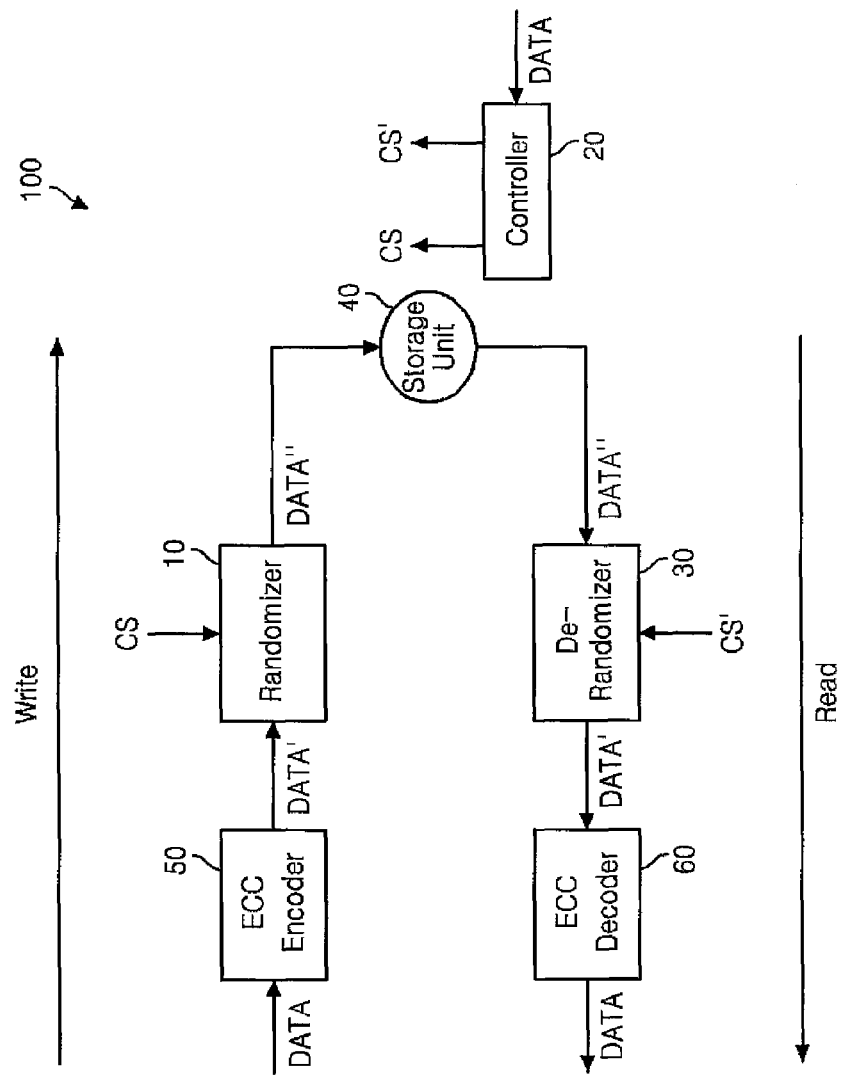
FIG. 1 is a block diagram illustrating a data storage device according to an embodiment of the inventive concept.

FIG. 1 is a block diagram illustrating a data storage device 100 according to an embodiment of the inventive concept. Referring to FIG. 1, the data storage device 100 generally comprises a randomizer 10, a de-randomizer 30, a data storage unit 40, and a controller 20. In FIG. 1, a write path associated with incoming write data (i.e., data to be stored in storage unit 40 in all of its associated data components, such as payload data, header data, ECC data, address data, control data, etc) traverses an ECC encoder 50 and randomizer 10 before reaching the data storage unit 40. A read path associated with read data (i.e., data retrieved from the data storage unit 40 in all of its associated data components, as above) traverses de-randomizer 30 and ECC decoder 60 before being passed to an external circuit (not shown).

The embodiment of illustrated in FIG. 1 assumes that the incoming write data (and correspondingly, the outgoing read data) undergo a conventional error detection and/or correction process (collectively or singularly, "ECC") before being stored in storage unit 40. One or more of many different kinds of ECC processing may be performed, and the corresponding ECC encoding and decoding functionality may be provided by hardware (circuits, systems, or devices), firmware, and/or software. However, those skilled in the art will recognize that ECC processing of the write/read data is optional and that other embodiments of the inventive concept will omit such processing and the corresponding circuit blocks.

As may be seen in FIG. 1, write data (DATA) is received from an external source (e.g., a data controller, a host device, a receiver front-end) and then passed to the ECC encoder 50. Encoded write data (DATA')—for example, write data having an added parity bit—added is then passed to the randomizer 10.

The controller 20 now determines a characteristic of the write data and provides a first control signal CS in response to the determined characteristic. For example, one characteristic that may be determined by the controller 20 is write data type (i.e., write data component type). Using the relatively simple example suggested above, write data may include payload data and corresponding meta data. Meta data typically includes information about the payload data, such as spare data bits, or parity bit data, etc.

The use of meta data in relation to the storage of write data and the retrieval of read data is well appreciated by those skilled in the art. For example, meta data (or more particularly the spare data portion of meta data) is commonly used to indicate a "bad" data block (i.e., a data block known to be errant and thus dismissed from further use). However, where such meta data is randomized, the risk of error introduction, while small, is nonetheless always present. Given this risk, embodiments of the inventive concept avoid randomizing such meta data once its type (i.e., its characteristic) is recognized, while continuing to randomize corresponding payload data.

In a more specific embodiment of the inventive concept, the controller 20 may determine the characteristic of the write data on the basis of one or more flag bits included within the write data. As the controller 20 determines whether the write data contains certain flag bits indicating data type, the randomizer 10 correspondingly and selectively randomizes the write data. In the illustrated embodiment of FIG. 1, incoming write data is either randomized or not (i.e., one or more parity bit(s) are calculated and added, or not) by the randomizer 10 on the basis of the first control signal CS provided by the controller 20. Thus, in the foregoing example which assumes prior ECC coding of write data, either randomized data (DATA") or non-randomized data (DATA') is output from randomizer 10 in response to the write data and the first control signal CS. The randomized data (DATA") and non-randomized data (DATA') provided by the randomizer 10 is then stored in the data storage unit 40.

Within various embodiments of the inventive concept, the randomizer 10 may take many different forms, including an additive randomizer, a synchronous randomizer, a multiplicative randomizer, or a self-synchronous randomizer. The operation of an exemplary randomizer 10 according to an embodiment of the inventive concept will be described in some additional detail with reference to FIG. 2A.

As may also be seen in FIG. 1, read data in the form of encoded, randomized or non-randomized, and stored write data (DATA") may now be retrieved from data storage unit 40 and passed to the de-randomizer 30. The de-randomizer 30 operates in response to a second control signal CS' received from the controller 20 to either de-randomize randomized read data (DATA") or not de-randomize non-randomized read data (DATA'). Following operation (or non-operation) of the de-randomizer 10 in relation to the second control signal CS', the de-randomized read data (DATA') is passed to the ECC decoder 60. Using an ECC decoding process corresponding to the formerly applied ECC encoding process, the ECC decoder provides decoded read data (DATA) to an external source.

Thus, selective randomization of write data is necessarily followed by mirroring selective de-randomization of read data. These mirroring processes are controlled respectively by the first and second control signals.

When the randomizer 10 is implemented as an additive randomizer, a similar (or the same circuit) may be used as a corresponding de-randomizer 30. Assuming sufficient data throughput in view of the operating speed of the data storage device 100, use of a common randomizer/de-randomizer circuit minimizes the cost and size of circuitry associated with the randomizing functionality. The operation of an exemplary de-randomizer 30 according to an embodiment of the inventive concept will be described in some additional detail with reference to FIG. 2B.

Of further note, the use of ECC encoder/decoder circuits allows any error introduced during the randomizing and de-randomizing processes to be detected and/or corrected. Hence, certain embodiments of the inventive concept will benefit from the incorporation of such circuitry.

In relation to the incoming write data, a data storage device according to an embodiment of the inventive concept may variously use a randomizer/de-randomizer seed having a size defined in terms of data sector(s), data page(s), data wordline(s), and/or data block(s). For example, the data storage device 100 of FIG. 1 may apply a first seed and a second seed respectively to a first sector and a second sector of incoming write data. This approach may be applied in similar manner to the units of pages, word lines, or blocks. For example, when a different seed for each sector is used during randomization, the amount of data to be randomized may be the same as the size of a sector.

In one embodiment of the inventive concept, the randomizer 10 randomizes the encoded write data (DATA') by adding a pseudo-random binary sequence (PRBS) to it. The PRBS may be generated by a linear feedback shift register (LFSR), for example. In such an embodiment, different PRBSs may be added to each write data unit by applying a different seed input to the LFSR for each data unit.

In this example, when the seed has a size of "M" bits, where M is a natural number, the PRBS generated by the seed may have a period of $(2^M-1)$. The seed may thus be calculated by using a block number, a word line number, a page number, or a sector number in certain embodiments of the inventive concept.

A plurality of pre-calculated seeds may be stored in memory (not shown) in certain embodiments of the inventive concept. The randomizer 10 or de-randomizer 30 may perform its process upon receiving an appropriate seed suitable from memory.

Thus, by applying a different seed to each defined data unit and not just applying a common seed to all write data, even write data having the same data pattern for each sector, page, word line, or block, may be better randomized within embodiments of the inventive concept.

Also, by applying different seeds via randomizer 10 to each sector, page, word line, or block, read data may be more effectively performed. For example, when a conventional randomizer is applied to two or more pages, (i.e., pages A and B) the manner in which the randomizer applied the seed to page A must be determined in order to de-randomize and read the data in page B. In contrast, according embodiments of the inventive concept, the data written to the page B may be independently read without determining how the randomizer is applied to the page A.

Figure 2B:
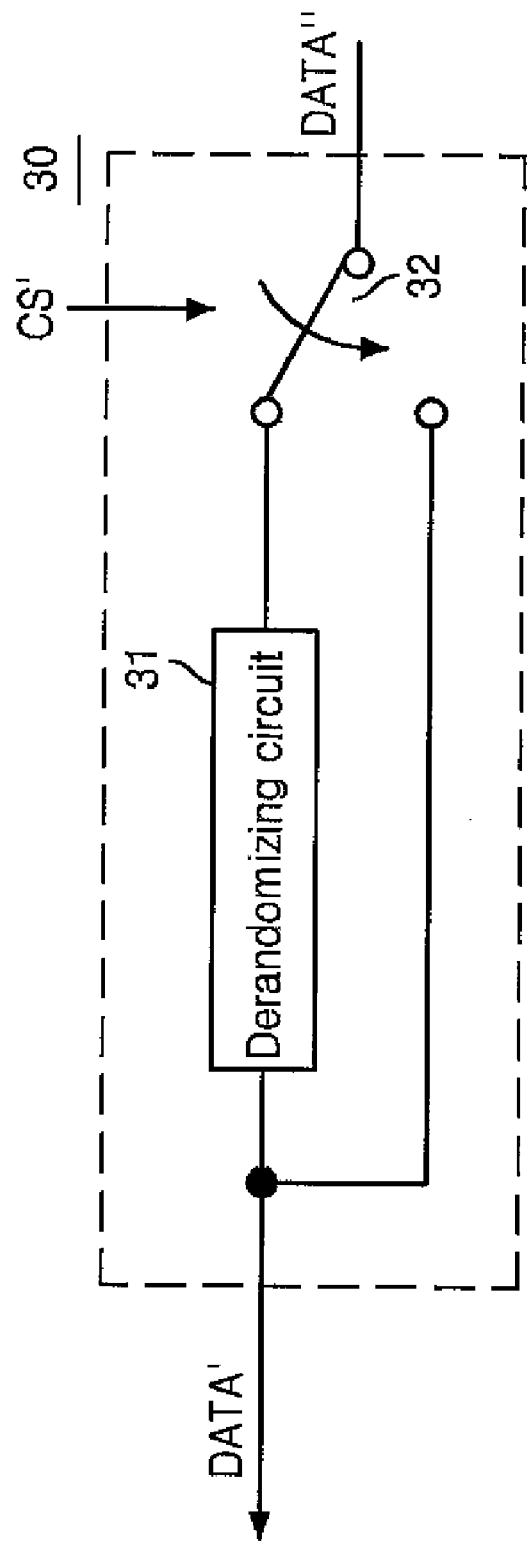
FIG. 2B is a block diagram illustrating a de-randomizer according to an embodiment of the inventive concept.

FIGS. 2A and 2B are block diagrams further and respectively illustrating the randomizer 10 and de-randomizer 30 of FIG. 1 according to embodiments of the inventive concept. Referring to FIGS. 1 and 2A, the randomizer 10 comprises a switch 12 operated in response to the first control signal CS provided by the controller 20 and a randomizing circuit 11 performing the data randomization process.

As described above, when either the write data (DATA) or encoded write data (DATA') (e.g., having a parity bit added by the ECC encoder 50) is applied to the randomizer 10, the controller 20 will provide the first control signal CS in relation to a determined characteristic of the write data. The switch 12 is switched in response to the first control signal CS, such that the write data (DATA) or encoded write data (DATA') passes through or by-passes the randomizing circuit 11 to generate randomized write data (DATA").

Continuing with the foregoing working example, when the write data (DATA) or encoded write data (DATA') is meta data or spare data, the controller 20 outputs the first control signal CS with a level (high/low) different from when the write data (DATA) or encoded write data (DATA') is payload data. Thus, when the first control signal CS indicates that the write data is meta data or spare data, the switch 12 operates to by-pass the randomizing circuit 11, but when the first control signal CS indicates that the write data is payload data, the switch 12 operates to pass the write data through the randomizing circuit 11.

FIG. 2B is a block diagram further illustrating the de-randomizer 30 according to an embodiment of the inventive concept. Referring to FIGS. 1, 2A, and 2B, the de-randomizer 30 operate in response to the second control signal CS' in a manner analogous to the foregoing. That is, a switch 32 is operated by the second control signal CS' to pass read data (READ") through a de-randomizing circuit 31 when the read data is determined to be payload data, but to by-pass the de-randomizing circuit 31 when the read data is determined to be meta data or spare data.

Figure 3:
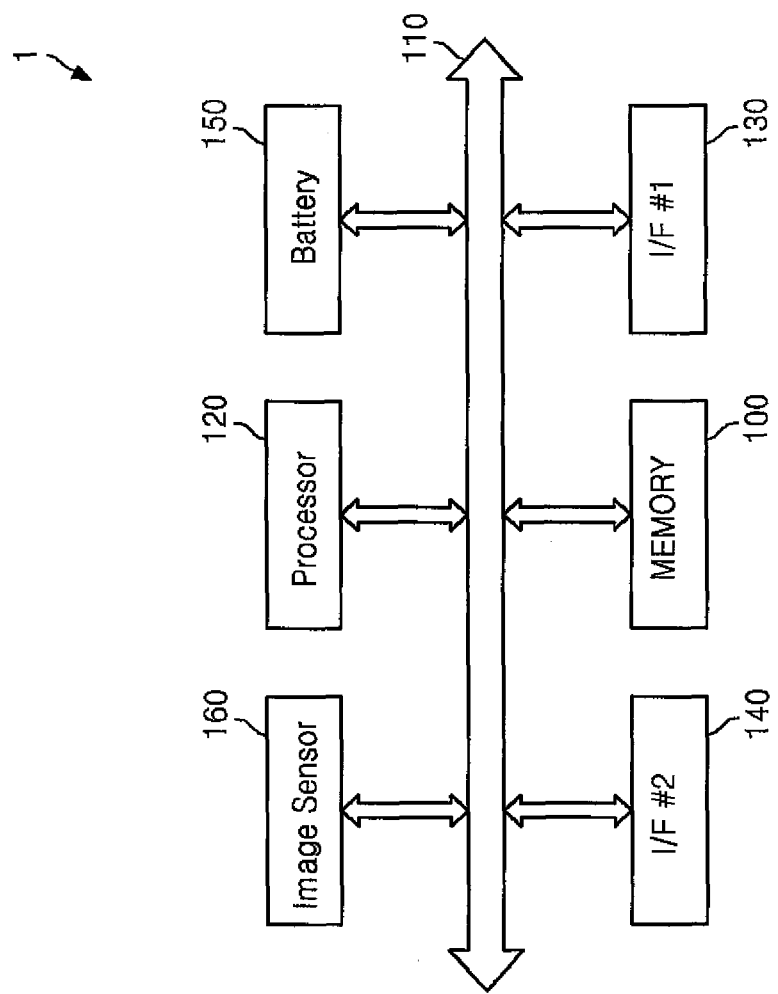
FIG. 3 is a block diagram illustrating a data storage system according to an embodiment of the inventive concept.

FIG. 3 is a block diagram illustrating a data storage system 1 incorporating a memory unit 100 according to an embodiment of the inventive concept. Referring to FIG. 3, the data storage system 1 comprises memory unit 100 having the form of the data storage device 100 previously described, for example. A processor 120 is connected to the memory unit 100 via a conventional system bus 110.

The processor 120 is configured to generate the first and second control signals, along with other control signals, to control the operation of the data storage device 100 (i.e., to execute write or program, read, verify, and erase operations). Thus, a control block of conventional design within the data storage device 100 may control the execution various in response to the control signals provided by the processor 120.

When the data storage system 1 is implemented within certain portable devices according to embodiments of the inventive concept, it may further comprise a battery 150 configured to supply operating power to the memory unit 100 and the processor 120. Such portable devices include, as example, portable computers, digital cameras, personal digital assistants (PDAs), cellular phones, MP3 players, portable multimedia players (PMPs), automotive navigation systems, memory cards, system cards, game consoles, electronic dictionaries, or solid state disks.

The data storage system 1 according to the illustrated embodiment of FIG. 3 further comprises a first input/output (I/O) device interface 130 capable of communicating data with an external data processing apparatus. When the data storage system 1 is a wireless system, it may further comprise second I/O device (or wireless) interface 140. In this case, the wireless interface 140 may be connected to the processor 120 and wirelessly transmit or receive data to or from an external wireless apparatus, via the system bus 110.

The wireless system may be PDAs, portable computers, wireless telephones, pagers, wireless apparatuses, RFID readers, or RFID systems. Also, the wireless system may be a wireless local area network (WLAN) system or a wireless personal area network (WPAN). Also, the wireless system may be a cellular network.

When data storage system 1 is an image pick-up device, the data storage system 1 may further comprise an image sensor 160 capable of converting optical images to electrical signals. The image sensor 160 may be an image sensor using a charge-coupled device (CCD) or a complementary metal-oxide semiconductor (CMOS). In this case, the data storage system 1 may be a digital camera or a mobile phone having a digital camera attached thereto. Also, the data storage system 1 may be a satellite system having a camera attached thereto.

As described above, in a data storage device according to an embodiment of the inventive concept, since incoming write data is selectively randomized, overall data storage efficiency for the data storage device may be improved. Since different seeds may be applied to each predetermined data unit, randomness of the randomized write data may be further improved. Furthermore, since a different seed may be applied to each data unit, read data retrieval may be better facilitated.

While the inventive concept has been particularly shown and described with reference to exemplary embodiments thereof, it will be understood that various changes in form and details may be made therein without departing from the scope of the following claims.

What is claimed is:

1. A data storage device receiving data to be stored in the data storage device and comprising:
 a controller configured to determine a characteristic of the data and provide a first control signal in response to the determined characteristic;
 a randomizer configured to selectively randomize or not randomize the data in response to the first control signal to thereby generate randomized data; and
 a data storage unit configured to store the randomized data;
 wherein the characteristic indicates whether the data is payload data or meta data.

2. The data storage device of claim 1, wherein the controller determines the characteristic of the data in relation to a flag included in the data.

3. The data storage device of claim 1, further comprising:
 an error detection and/or correction (ECC) encoder configured to receive the data and generate encoded data,
 wherein the randomizer is configured to selectively randomize or not randomize the encoded data in response to the first control signal to thereby generate the randomized data.

4. The data storage device of claim 3, wherein the ECC encoder is configured to generate the encoded data by adding a parity bit to the received data.

5. The data storage device of claim 3, wherein the randomizer selectively randomizes the encoded data using a different seed for each unit of the data, wherein the unit of the data is defined by one of a sector, a page, a word line, and a block.

6. The data storage device of claim 1, wherein the randomizer selectively randomizes the data using a different seed for each unit of the data, wherein the unit of the data is defined by one of a sector, a page, a word line, and a block.

7. The data storage device of claim 1, wherein the randomizer comprises:
 a randomizer circuit generating the randomized data; and
 a switch operated by the first control signal to pass the data through the randomizer circuit when the controller determines a first characteristic for the data, or to by-pass the randomizer circuit with the data when the controller determines a second characteristic for the data.

8. A data storage device retrieving data and comprising:
 a data storage unit configured to store the data;
 a controller configured to determine a characteristic of the data and provide a second control signal in response to the determined characteristic; and
 a de-randomizer configured to selectively de-randomize or not de-randomize the data in response to the second control signal to thereby generate de-randomized data;

wherein the characteristic indicates whether the data is payload data or meta data.

9. The data storage device of claim 8, wherein the controller determines the characteristic of the data in relation to a flag included in the data.

10. The data storage device of claim 8, further comprising:
an error detection and/or correction (ECC) decoder configured to receive the de-randomized data and generate decoded data,
wherein the de-randomizer is configured to selectively de-randomize or not de-randomize the data in response to the second control signal to thereby generate the de-randomized data.

11. The data storage device of claim 10, wherein the ECC decoder is configured to generate the decoded data by removing a parity bit from the received de-randomized data.

12. The data storage device of claim 10, wherein the de-randomizer selectively de-randomizes the data using a different seed for each unit of the data, wherein the unit of the data is defined by one of a sector, a page, a word line, and a block.

13. The data storage device of claim 8, wherein the de-randomizer selectively de-randomizes the data using a different seed for each unit of the data, wherein the unit of the data is defined by one of a sector, a page, a word line, and a block.

14. The data storage device of claim 8, wherein the de-randomizer comprises:

a de-randomizer circuit generating the de-randomized data; and
a switch operated by the second control signal to pass the data through the de-randomizer circuit when the controller determines a first characteristic for the data, or to by-pass the de-randomizer circuit with the data when the controller determines a second characteristic for the data.

15. A system comprising:
a controller connected to a memory unit via a system bus, wherein the controller is configured to determine a characteristic of received data and stored data, and provide first and second control signals in response to the determined characteristic;
a randomizer configured to selectively randomize or not randomize the received data in response to the first control signal to thereby generate randomized data;
a data storage unit configured to store the randomized data; and
a de-randomizer configured to selectively de-randomize or not de-randomize the stored randomized data retrieved from the data storage unit in response to the second control signal to thereby generate de-randomized data;
wherein the characteristic indicates whether the received data is payload data or meta data.

* * * * *